United States Patent
Taylor et al.

(10) Patent No.: US 10,095,462 B2
(45) Date of Patent: Oct. 9, 2018

(54) INTERACTIVE DISPLAY

(75) Inventors: Norman G. Taylor, Dundee (GB); Jonathan S. Black, Dundee (GB)

(73) Assignee: NCR Corporation, Atlanta, GA (US)

( * ) Notice: Subject to any disclaimer, the term of this patent is extended or adjusted under 35 U.S.C. 154(b) by 1339 days.

(21) Appl. No.: 12/512,457

(22) Filed: Jul. 30, 2009

(65) Prior Publication Data

US 2011/0029369 A1    Feb. 3, 2011

(51) Int. Cl.
*G06Q 30/00*    (2012.01)
*G06F 3/147*    (2006.01)
*G06Q 30/02*    (2012.01)

(52) U.S. Cl.
CPC ......... *G06F 3/147* (2013.01); *G06Q 30/0207* (2013.01); *G06Q 30/0235* (2013.01); *G09G 2380/06* (2013.01)

(58) Field of Classification Search
CPC .. G06Q 30/0207; G06Q 30/0235; G06K 9/00; G06K 19/06; G06K 7/14
USPC ..................................................... 705/14.35
See application file for complete search history.

(56) References Cited

U.S. PATENT DOCUMENTS

| | | | |
|---|---|---|---|
| 6,442,276 B1* | 8/2002 | Doljack | 380/51 |
| 7,822,411 B2* | 10/2010 | Nakatani | 455/420 |
| 2007/0214043 A1* | 9/2007 | Yasuda | 705/14 |
| 2008/0195456 A1* | 8/2008 | Fitzpatrick | G06F 17/30867 705/7.15 |
| 2009/0157530 A1* | 6/2009 | Nagamoto et al. | 705/27 |

* cited by examiner

*Primary Examiner* — Yehdega Retta
(74) *Attorney, Agent, or Firm* — Schwegman, Lundberg & Woessner

(57) ABSTRACT

An interactive display for presenting an optical pattern spatially encoding an electronic voucher is described. The interactive display comprises: a display arranged to present an optical pattern; and a controller coupled to the display. The controller is arranged to (i) generate a unique code; (ii) combine the generated unique code with an electronic offer to create a new optical pattern spatially encoding an electronic voucher; and (iii) present the new optical pattern on the display in response to a renewal criterion being satisfied.

14 Claims, 2 Drawing Sheets

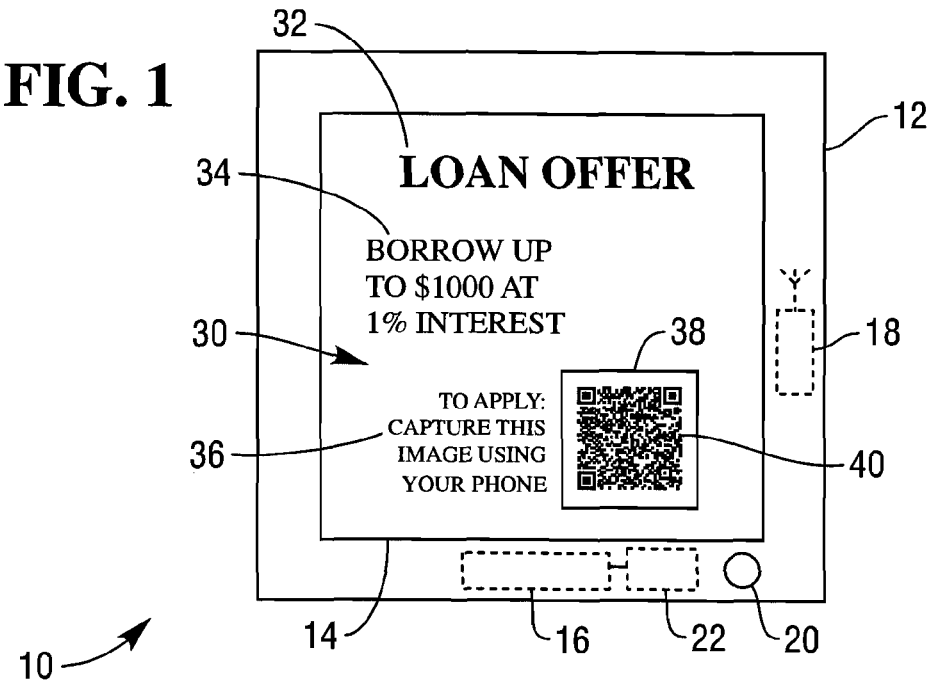
FIG. 1
FIG. 2
FIG. 3
CODE = A5F3A63E87
LOCATION = 1221
www.yourbank.com/loanoffer/1percent/offer.cgi?location=_&code=_

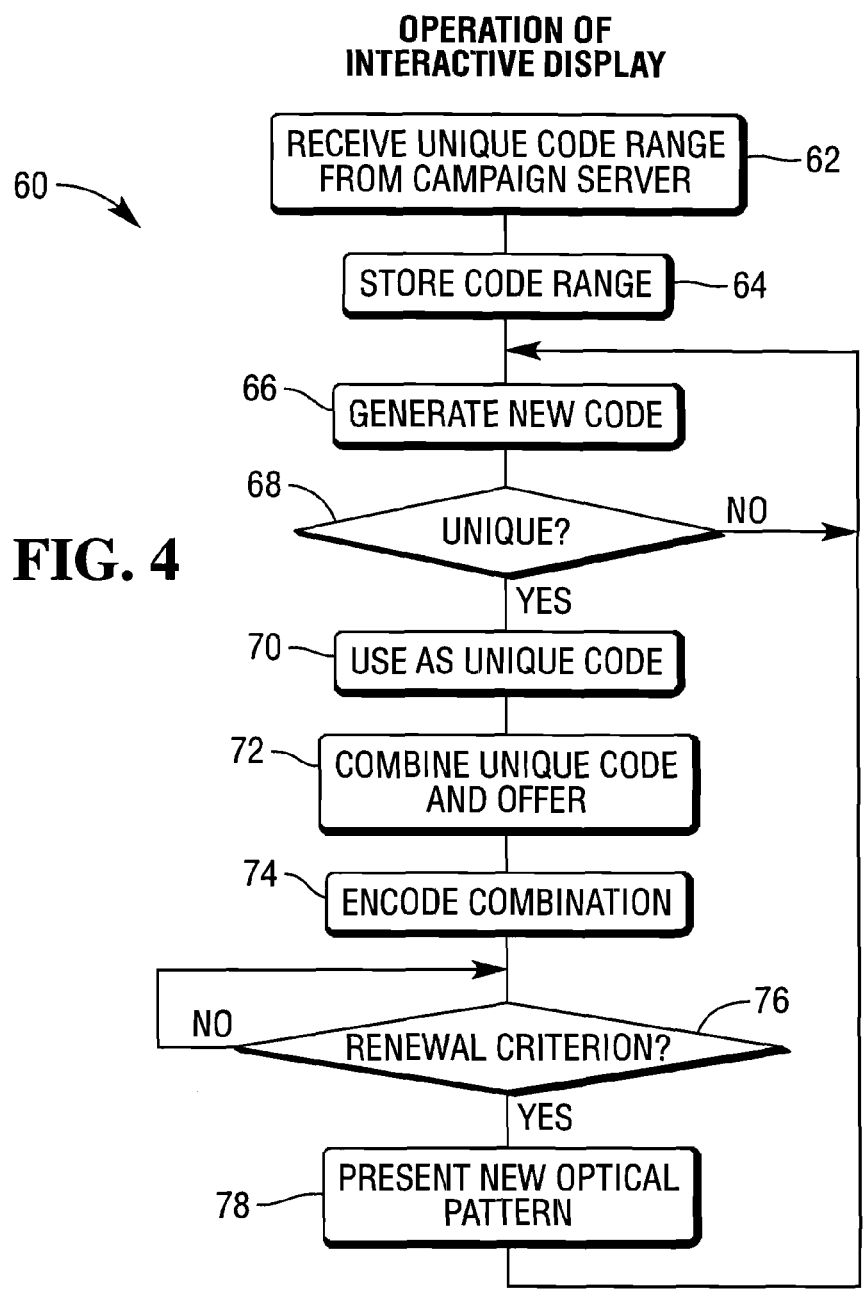
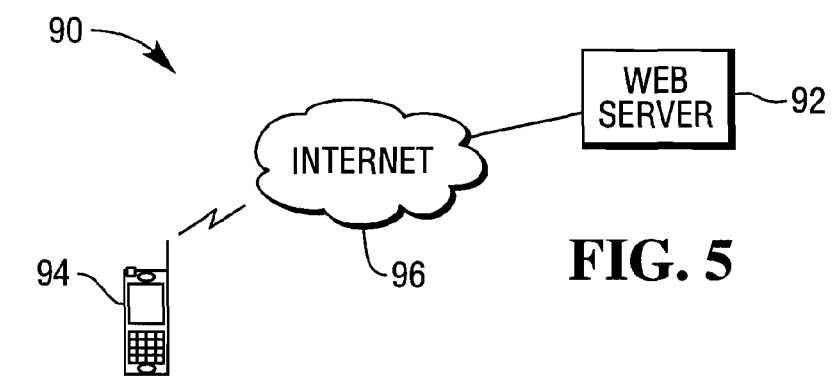

INTERACTIVE DISPLAY

FIELD OF THE INVENTION

The present invention relates to an interactive display.

BACKGROUND OF INVENTION

Interactive displays present information and/or vouchers, typically in the form of an optical pattern. These optical patterns comprise spatial codes that can be captured by a portable device. A user of a portable device holds the portable device in the vicinity of the optical pattern and uses a camera incorporated within the portable device to capture an image of the optical pattern from the interactive display. The captured optical pattern is then decoded by the portable device to create an electronic voucher, which is then used by that portable device.

The electronic voucher typically includes a Uniform Resource Locator (URL) that the portable device loads into its Web browser. This allows the user to access an offer, a service, or the like, without having to remember any special codes or type copious amounts of data into a keyboard on the portable device.

These interactive displays are very useful for presenting offers to passers by, but there are some problems associated with these interactive displays. The information presented can be used multiple times, particularly if someone transmits an image of the optical pattern to a friend or loads the image of the optical pattern onto a Web site for other people to download and use. Furthermore, the interactive display has no information about how many times an optical pattern has been captured by passers by.

SUMMARY OF INVENTION

Accordingly, the invention generally provides methods, systems, apparatus, and software for an interactive display that provides a unique spatial code to different users.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided an interactive display for presenting an optical pattern that spatially encodes an electronic voucher, the interactive display comprising: a display arranged to present an optical pattern; and a controller coupled to the display and arranged to (i) generate a unique code; (ii) combine the generated unique code with an electronic offer to create a new optical pattern spatially encoding an electronic voucher; (iii) present the new optical pattern on the display in response to a renewal criterion being satisfied.

The new optical pattern may be presented at a spatial code location on the display. The spatial code location may be fixed; that is, the spatial code location may be located at the same position on the display each time a new optical pattern is presented. Alternatively, the spatial code location may be moved so that each new optical pattern is presented at a different position on the display than the previous optical pattern.

The spatial code location may include persistent text and/or graphics surrounding the new optical pattern. The persistent text and/or graphics do not change with each new optical pattern. The persistent text and/or graphics may provide instructions or information to a user about how to capture the new optical pattern or details of an offer to which the new optical pattern relates.

The display may comprise a liquid crystal display, a plasma display, a cathode ray tube display, an electroluminescent panel, an electronic ink display, a front projection display, a rear projection display, or any other convenient display. Preferably, the display has greater resolution than is required to render the optical pattern.

The interactive display may further comprise a memory arranged to store a list of every unique code generated.

In generating a unique code, the controller may be arranged to: generate a new code; compare the new code with the list of every unique code previously generated; and, in the event that the new code does not match a previously generated code, use the new code as a unique code, otherwise discard the new code.

The electronic offer may relate to a discount from a standard price or cost of goods or services, an upgrade to goods or services, preferential terms and conditions relating to goods or services, free goods or services, or the like.

In generating a new code, the controller may be arranged to: generate a new code within a predefined range provided by a campaign manager. The campaign manager may provide the predefined range electronically, for example, by transfer from a server, a storage device (such as a memory stick), or the like. The storage device may be temporarily inserted into a slot in the interactive display.

By providing different predefined code ranges to different interactive displays, and/or by providing a unique location identifier (or a combination of a unique code and a location identifier) a campaign manager can track which electronic vouchers originated from which interactive displays. The campaign manager function may be implemented manually (by a person) or automatically (by software).

The renewal criterion may comprise a predefined time period elapsing. For example, the controller may present a new optical pattern every sixty seconds, ten seconds, five seconds, two seconds, or the like. The predefined time period may change for different time periods, for example, the predefined time period may be longer during night time, or during a period known to have few passers by.

The interactive display may further comprise a proximity sensor coupled to the controller and arranged to detect an object (such as a user's hand or a portable device) within the vicinity of the display (or the spatial code location). The renewal criterion may comprise the controller receiving a signal from the proximity detector indicating that an object has been sensed within the proximity of the interactive display (or the spatial code location).

The proximity sensor may comprise an ultrasonic, inductive, capacitive or optical proximity sensor. Suitable proximity sensors are available from Pepperl+Fuchs GmbH, Lilienthalstraße 200, 68307 Mannheim, Germany. Conveniently, the proximity sensor is an ultrasonic proximity sensor to allow detection of metallic and non-metallic objects at a range of up to approximately one meter.

Alternatively, or additionally, the interactive display may further comprise a switch, such as a push button, activatable by a user and coupled to the controller. The renewal criterion may comprise the controller receiving a signal from the switch indicating that a user has requested a new optical pattern to be displayed.

The switch may be implemented as a graphic on the display that is selected via a touch-sensitive panel overlying the display. Alternatively, the switch may be implemented as a physical device that is depressed by a user.

The renewal criterion may comprise a single event or condition, or a plurality of events and/or conditions occurring sequentially and/or in parallel. For example, where the interactive display enables a user to perform a transaction (either at the interactive display or at a terminal in which the interactive display is incorporated), the renewal criterion may comprise a transaction being completed or initiated.

The new optical pattern preferably comprises a machine readable code, such as a two-dimensional bar code (also referred to as a matrix code). The matrix code may implement any convenient symbology, such as the QR (Quick Response) code (trade mark) symbology.

According to a second aspect there is provided a method of presenting an optical pattern on an interactive display, the method comprising: generating a unique code; combining the generated unique code with an electronic offer; spatially encoding the combined unique code and electronic offer to create a new optical pattern representing an electronic voucher; and presenting the new optical pattern on a display in response to a renewal criterion.

The step of generating a unique code may comprise the steps of: generating a new code; comparing the new code with a list of previously generated codes; and, in the event that the new code does not match a previously generated code, using the new code as a unique code.

The step of generating a new code may comprise generating a new code within a predefined range provided by a campaign manager.

The renewal criterion may comprise a predefined time period elapsing. For example, the controller may present a new optical pattern every five seconds. Alternatively or additionally, the renewal criterion may comprise the controller receiving a signal from a proximity detector indicating that an object has been sensed within the proximity of the interactive display. Alternatively or additionally, the renewal criterion may comprise receiving a signal from the switch indicating that a user has requested a new optical pattern to be displayed.

According to a third aspect there is provided an interactive display system for presenting an optical pattern that spatially encodes an electronic voucher, the system comprising: an interactive display according to the first aspect; and a server operable to transfer an electronic offer to the interactive display for incorporation with a unique code, and presentation by the interactive display.

The server may be arranged to transfer a predefined unique code range to the interactive display, where the predefined unique code range is unique to that interactive display.

According to a fourth aspect there is provided computer software for implementing the second aspect.

According to a fifth aspect there is provided a computer readable medium tangibly embodying one or more programs of instructions executable by a computer, to perform all of the method steps of the second aspect.

According to a sixth aspect there is provided a terminal incorporating the interactive display of the first aspect.

The terminal may be a self-service terminal. The self-service terminal may be an automated teller machine (ATM), an information kiosk, a financial services center, a bill payment kiosk, a lottery kiosk, a postal services machine, a check-in and/or check-out terminal such as those used in the retail, hotel, car rental, gaming, healthcare, and airline industries, and the like.

It will now be appreciated that by virtue of one or more of these aspects an optical pattern can be provided that is unique, and that can be traced to the particular interactive display that generated that optical pattern.

These and other aspects will be apparent from the following specific description, given by way of example, with reference to the accompanying drawings.

BRIEF DESCRIPTION OF THE DRAWINGS

FIG. 1 is a schematic diagram of an interactive display according to one embodiment of the present invention;

FIG. 2 is a pictorial diagram illustrating an optical pattern presented on the interactive display of FIG. 1;

FIG. 3 is a schematic diagram illustrating components of an electronic voucher prior to encoding the voucher to create the optical pattern of FIG. 2;

FIG. 4 is a flowchart illustrating steps involved in creating and presenting a new optical pattern for the interactive display of FIG. 1; and FIG. 5 is a schematic diagram illustrating a system for using the optical pattern of FIG. 2.

DETAILED DESCRIPTION

Reference is first made to FIG. 1, which is a schematic diagram of an interactive display 10 according to one embodiment of the present invention. The interactive display 10 comprises a housing 12 and the following components mounted therein: a display 14; a controller 16 in communication with the display 14; a network connection 18 coupled to the controller 16; a proximity sensor 20 coupled to the controller 16, and a memory 22 coupled to the controller 16.

The network connection 18 comprises a wireless transceiver for communicating with a remote campaign server (not shown) via the Internet.

In this embodiment, the proximity sensor 20 comprises an ultrasonic proximity sensor for detecting a portable device (such as a cellular radiofrequency telephone (a cellphone) or a portable digital assistant (PDA)) in proximity to the display 14.

The display 14 presents screens comprising text and graphics. As used herein, a display refers to hardware; whereas a screen refers to software, that is, an image presented on the hardware. The display 14 can present a sequence of different screens to a user over a period of time.

The display 14 presents a sequence of screens to passers by, including an attract screen 30. The attract screen 30 comprises banner text 32 displayed along a top edge of the display 14; details of an offer 34; instructions 36 to a user who wishes to download the offer 34, a spatial code location 38 in which an optical pattern 40, in the form of a matrix code, is presented. In this example, the matrix code is a Quick Response (QR) code.

The matrix code 40 is shown more clearly in FIG. 2, although the particular matrix code 40 illustrated in the drawings may not be a functioning example due to simplifications in reproducing the image for the purposes of this patent application.

The matrix code 40 spatially encodes three component parts, as illustrated in FIG. 3. The first component part 42 is a unique code; the second component part 44 is a location identifier (which is constant for the interactive display, but each interactive display has its own unique location identifier), and the third component part 46 is an electronic offer. The location identifier 44 is assigned to the interactive display 10 by a campaign manager (not shown), but the unique code 42 is generated by the interactive display 10 as will be described with reference to FIG. 4, which is a flowchart 60 illustrating steps involved in creating and presenting a new matrix code 40 for the interactive display 10.

Initially, the controller 16 receives a predefined unique code range from the campaign server (not shown) (step 62). In this example, the predefined code range assigned to the interactive display 10 comprises all codes having ten digits and starting with the hexadecimal value "A". There may be other interactive displays coupled to the campaign server having different predefined unique code ranges, for example, ten digits starting with the hexadecimal value "B", "C", and the like. The controller 16 may receive this predefined unique code range via the wireless transceiver 18.

The controller 16 stores this predefined unique code range in the memory 22 (step 64).

The controller 16 then generates a new code within the predefined range using a pseudo-random number generator routine executing within the controller 16 (step 66).

The controller 16 then compares this newly generated code with a list of previously generated codes stored in the memory 22 (step 68) to ascertain if the newly generated code is a duplicate or unique.

If the newly generated code is a duplicate (not unique), then the controller 16 rejects the newly generated code and generates a new code by reverting to step 66.

If the newly generated code is not a duplicate, then the controller uses the new code as the new unique code 42 (step 70).

The controller 16 then combines the new unique code 42, the location identifier 44, and the electronic offer 46 previously communicated by the campaign server (not shown) and stored in memory 22 (step 72) to produce a single URL.

The controller 16 then spatially encodes the combined unique code, location identifier, and electronic offer (that is, the single URL) to create a new optical pattern 40 representing an electronic voucher (step 74).

At this stage, the new optical pattern 40 is pre-staged and ready to be used when needed. The controller 16 then awaits fulfillment of a renewal criterion (step 76), which will indicate that the new optical pattern 40 is needed.

In this embodiment, the renewal criterion comprises the proximity sensor 20 detecting a user's cellphone or PDA in front of the spatial code location 38, indicating that the user is capturing an image of the optical pattern 40.

When the controller 16 receives a signal from the proximity sensor 20 indicating that a portable device has been detected, then the renewal criterion is satisfied, and the controller 16 instructs the display 14 to present the new optical pattern 40 on the display (step 78). The controller 16 may insert a time delay (for example, ten seconds) to ensure that the user is able to capture the current optical pattern successfully.

The controller 16 then reverts to step 66, where a new code is generated.

The use of the optical pattern 40 will now be described with reference to FIG. 5, which is a schematic diagram illustrating an optical pattern system 90.

The system 90 includes a Web server 92 for responding to the URL included in the electronic offer 46 and a portable device 94 carried by a user and coupled to the Web server 92 by the Internet 96. The portable device 94 includes a camera (not shown) for capturing an image of the optical pattern 40, and a processor (not shown) for processing the optical pattern 40 to retrieve the electronic offer 46.

When the user has captured the optical pattern 40, then his/her portable device 94 decodes the optical pattern 40 to retrieve and process the electronic offer 46. In this embodiment, the portable device 94 processing the electronic offer 46 is implemented by loading the URL into a Web browser executing on the portable device 94. The URL includes the unique code and the location identifier as parameters that are supplied to the Web server 92.

The Web server 92 processes the unique code to ensure that it is not a duplicate; that is, to ensure that this optical pattern 40 has not been used previously. If the unique code is a duplicate then the Web server may decline to provide the offer, or it may provide the offer if the code has not been presented on more than a predetermined number of occasions, for example, twice.

If the unique code is not a duplicate, then the Web server 92 processes the offer in accordance with the terms and conditions of the offer.

The Web server 92 extracts the electronic offer information (the third component part 46) and the location information (the second component part 44) and conveys this to the campaign manager (not shown). The campaign manager stores this information in a data repository and analyses the data repository to ascertain the redemption percentage of electronic offers based on each location, the redemption percentage based on the type of electronic offer presented, and the like. The campaign manager can use this information to assess the most effective location and/or time for a particular electronic offer. The campaign manager can also tailor an electronic offer to be more appropriate for a particular location based on the information stored in the data repository. The campaign manager may also allocate a different time slot for an electronic offer based on the information stored in the data repository.

It will now be appreciated that this embodiment has the advantage that an electronic voucher may only be presented once, and if a voucher is presented more than once it is possible to identify which interactive display issued the voucher based on the location identifier and/or the unique code within the voucher.

The interactive display 10 may be mounted within a terminal, such as a self-service terminal.

Various modifications may be made to the above described embodiment within the scope of the invention, for example, the renewal criterion may comprise a predefined time period elapsing. For example, the controller may present a new optical pattern every five seconds. Alternatively or additionally, the renewal criterion may comprise the controller receiving a signal from a proximity detector indicating that an object has been sensed within the proximity of the interactive display. Alternatively or additionally, the renewal criterion may comprise receiving a signal from a switch indicating that a user has requested a new optical pattern to be displayed.

The optical pattern may comprise a different symbology than that described above. For example, a Microsoft Tag (trade mark), Datamatrix bar code, a PDF417 bar code, an Aztec bar code, or any other convenient spatial code may be used.

In other embodiments, the electronic voucher may include a time at which the voucher was generated, a check-sum (or hash value) to confirm that the data included in the electronic voucher is valid, a campaign identifier, or the like.

In other embodiments, a terminal including the Web server 92 may dispense valuable media in response to receiving the electronic voucher from a portable device.

In other embodiments, a range of unique codes may not be provided; instead, the controller may generate a code unique to that interactive display, and combine this code with a unique location identifier, so that the combination is unique to that interactive display.

In other embodiments, the campaign manager may be implemented on the Web server 92 rather than being separate from the Web server 92.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. An interactive display for presenting an optical pattern that spatially encodes an electronic voucher, the interactive display comprising:
   a Self-Service Terminal (SST) having the interactive display;
   the interactive display arranged to present an optical pattern;
   a proximity sensor that is an ultrasonic sensor configured to detect a hand of a user or a portable device operated by the user is within a meter of the interactive display; and
   a controller coupled to the display and arranged to:
   (i) generate a new code;
   (ii) compare the new code of (i) with a list of previously generated codes;
   (iii) repeat (i) and (ii) until a new code is generated which does not match a previously generated code;
   (iv) use the last generated new code of (iii) as a unique code;
   (v) combine the unique code with an electronic offer and a location identifier for the interactive display and spatially encode the combined unique code and electronic offer to create a new optical pattern representing an electronic voucher; and
   (vi) present the new optical pattern at a fixed spatial code location on the interactive display as a screen on the interactive display in response to a renewal criterion for the new optical pattern being detected by the proximity sensor when the hand of the user or the portable device is detected within the meter of the display and maintain the new optical pattern on the interactive display for a time delay to ensure the new optical pattern is captured by the user before removing the new optical pattern and detecting a second renewal criterion for generating a second new optical pattern after the time delay expires, wherein the spatial code location also includes presented persistent text and graphics that surrounds the presented new optical pattern, and the persistent text and graphics do not change with other new optical patterns presented in place of the new optical pattern as the screen, and wherein the persistent text and graphics providing information for the electronic offer to the user and how to capture the new optical pattern for redemption by the user, wherein when the new optical pattern is captured by the portable device operated by the user, the portable device decodes the new optical pattern and loads a Uniform Resource Locator (URL) link to a web browser processing on the portable device causing the unique code and location identifier to be sent to a server, wherein the server validates that the unique code was not received before by the server, communicates the unique code and location identifier to a campaign manager and redeems the electronic offer for the user.

2. An interactive display according to claim 1, wherein the interactive display further comprises a memory arranged to store a list of every unique code generated.

3. An interactive display according to claim 1, wherein the renewal criterion comprises a predefined time period elapsing.

4. An interactive display according to claim 1, wherein the interactive display further comprises a switch activatable by the user and coupled to the controller.

5. An interactive display according to claim 4, wherein the renewal criterion comprises the controller receiving a signal from the switch indicating that a user has requested a new optical pattern to be displayed.

6. An interactive display according to claim 1, wherein the new optical pattern comprises a machine readable matrix code.

7. A method of operating an interactive display to present an optical pattern that spatially encodes an electronic voucher on a display of the interactive display, the method comprising:
   (i) generating, by a controller of the interactive display, a new code, wherein the interactive display is integrated into a Self-Service Terminal (SST);
   (ii) comparing, by the controller, the new code of (i) with a list of previously generated codes;
   (iii) repeating, by the controller, (i) and (ii) until a new code is generated which does not match a previously generated code;
   (iv) using, by the controller, the last generated new code of (iii) as a unique code;
   (v) combining, by the controller, the unique code with an electronic offer and a location identifier for the interactive display;
   (vi) spatially encoding, by the controller, the combined unique code and the electronic offer to create a new optical pattern representing an electronic voucher; and
   (vii) presenting, by the controller, the new optical pattern at a fixed spatial code location on the interactive display as a screen on the display of the interactive display in response to detecting a renewal criterion by a proximity sensor of the display when a hand of a user or a portable device operated by the user is detected within a meter the display and maintaining the new optical pattern on the interactive display for a time delay to ensure the new optical pattern is captured by the user before removing the new optical pattern and detecting a second renewal criterion that generates a second new optical pattern after the time delay expires, and wherein the proximity sensor is an ultrasonic, wherein the spatial code location also includes presented persistent text and graphics that surrounds the new optical pattern, and the persistent text and graphics do not change with other new optical patterns presented in place of the new optical pattern as the screen, and providing with the persistent text and graphics information for the electronic offer to the user and how to capture the new optical pattern for redemption by the user, wherein when the new optical pattern is captured by the portable device operated by the user, the portable device decodes the new optical pattern and loads a Uniform Resource Locator (URL) link to a web browser processing on the portable device causing the unique code and location identifier to be sent to a server, wherein the server validates that the unique code was not received before by the server, communicates the unique code and location identifier to a campaign manager and redeems the electronic offer for the user.

8. A method according to claim 7, wherein (i) comprises generating a new code within a predefined range provided by the campaign manager.

9. A method according to claim 7, wherein the renewal criterion comprises receiving a signal from a switch indicating that the user has requested a new optical pattern to be displayed.

10. A method according to claim 7, wherein the renewal criterion comprises a predefined time period elapsing.

11. A method of operating an interactive display to present an optical pattern that spatially encodes an electronic voucher on a display of the interactive display, the method comprising:
(i) generating, by a controller of the interactive display, a new code, wherein the interactive display is integrated into a Self-Service Terminal (SST);
(ii) comparing, by the controller, the new code of (i) with a list of previously generated codes which are stored in memory to determine if the new code of (i) matches a code contained in the list of previously generated codes;
(iii) repeating, by the controller, (i) and (ii) until a new code is generated which does not match a code contained in the list of previously generated codes;
(iv) using, by the controller, the last generated new code of (iii) as a unique code;
(v) combining, by the controller, the unique code with an electronic offer and spatially encode the combined unique code and electronic offer to create a new optical pattern and representing an electronic voucher; and
(vi) presenting, by the controller, the new optical pattern at a fixed spatial code location on the interactive display as a screen on the display of the interactive display in response to a renewal criterion being detected satisfied based on detection by a ultrasonic proximity sensor of the display when a hand of a user or a portable device operated by the user is detected within a meter of the display and maintaining the new optical pattern on the interactive display for a time delay to ensure the new optical pattern is captured by the user before removing the new optical pattern and detecting a second renewal criterion that generates a second new optical pattern after the time delay expires, wherein the spatial code location also includes presented persistent text and graphics and surrounds the presented new optical code, and the persistent text and graphics do not change with other new optical patterns presented in place of the new optical pattern as the screen, and providing with the persistent text and graphics instructions on how the new optical pattern is to be captured by the user from the screen on the display and redeemed by the user, wherein when the new optical pattern is captured by the portable device operated by the user, the portable device decodes the new optical pattern and loads a Uniform Resource Locator (URL) link to a web browser processing on the portable device causing the unique code and location identifier to be sent to a server, wherein the server validates that the unique code was not received before by the server, communicates the unique code and location identifier to a campaign manager and redeems the electronic offer for the user.

12. A method according to claim 11, wherein the renewal criterion comprises a predefined time period elapsing.

13. A method according to claim 11, wherein the renewal criterion comprises receiving a signal indicative of the user of the interactive display requesting a new optical pattern to be displayed.

14. A method according to claim 11, wherein the new optical pattern comprises a machine readable matrix code.

* * * * *